UNITED STATES PATENT OFFICE.

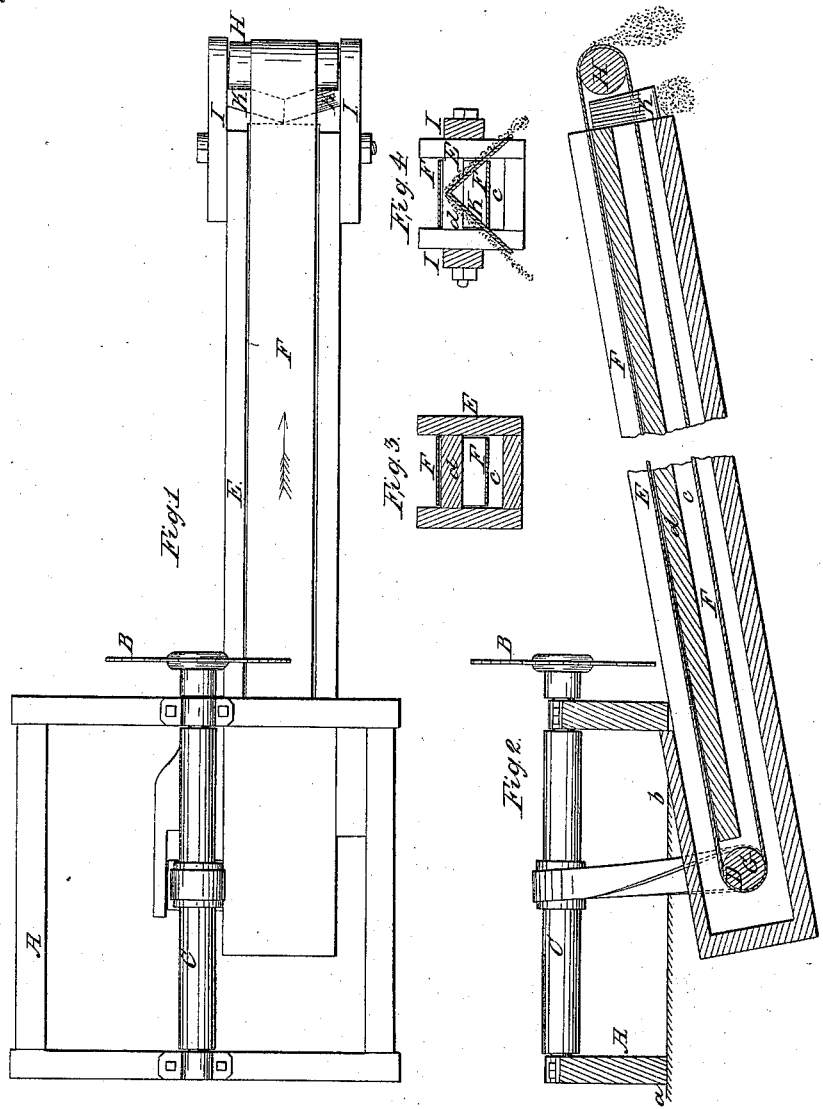

O. H. BURDETT, OF MOOREFIELD, OHIO.

REMOVING SAWDUST AS IT IS FORMED.

Specification of Letters Patent No. 31,779, dated March 26, 1861.

*To all whom it may concern:*

Be it known that I, O. H. BURDETT, of Moorefield, in the county of Harrison and State of Ohio, have invented a new and useful Improvement in Devices for Removing Sawdust from Mills; and I do hereby declare that the following, taken in connection with the accompanying drawing, which forms part of this specification, is such a full and clear description as to enable others skilled in the constructing and working of other devices for the like purpose to make and use this my improvement.

Numerous contrivances have been proposed and applied for removing automatically, either at regular or irregular intervals or continuously, the dust produced by the saw or saws of a mill employed in cutting up timber. The object of such contrivances has sometimes been simply the prevention of a large or obstructive accumulation of saw-dust at or about the vicinity of the saw or in the saw-pit, and to dispense with the stopping of the mill, as well as with the expenditure of manual labor, to effect from time to time the removal of the dust. Distinct from this, or in connection with such, it has also been the object of such contrivances to utilize the dust by feeding it, as made, from the mill to a furnace or furnaces to serve as fuel thereto, or otherwise be made available to a useful purpose by a continuous or intermittent succession of feeds governing the supply to the demand, or keeping up a superabundant supply away from the mill.

My invention also has either or both of these objects in view, and, in the construction of it, I use, as one of its elements, that very common device for a conveyer generally, whether the same be used for feeding or delivering purposes or both, of an endless belt or apron carrier, such as may be found in numerous agricultural and other machines. I also use that equally common device, for conveying purposes, of a spout or spouts. But I use these two elements in combination, and under a peculiar construction or arrangement of them, in connection with another element or other elements, substantially as hereinafter described and wherein consists the novelty and superior utility of my improvement.

In the accompanying drawing, my invention is shown as applied to a circular saw of a portable mill, but it is equally applicable to other saws or mills.

In said drawing, Figure 1 represents a plan view; Fig. 2 a vertical longitudinal section; and Figs. 3 and 4 nearly vertical transverse sections taken respectively through the body and front portion of the conveyer.

The part marked A, may be supposed to represent an ordinary portable circular saw frame, and which may rest on timbers let into the ground, in which case the line, $a$, $b$, may indicate the top line or surface of the ground.

B, is the circular saw, and, C, its shaft connected by a cross or twisted belt with a pulley, D, below, to operate the dust carrier which may however be otherwise driven.

E, is a long spout arranged relatively to the saw so as to catch the saw-dust produced by the latter in cutting, and sloping upward from under the saw or saw-frame so as to secure the removal of the dust to such elevation above the ground as the necessities of after delivery or transfer may require. This spout, E, is preferably made with a lower compartment ($c$) arranged longitudinally to the upper one and separated from it by a longitudinal partition ($d$), which forms the bottom to the upper compartment or dust spout, E, so as to inclose and keep from swaying by the action of the wind or otherwise both runs or lengths of the long endless belt or dust carrier, F, which is shown as passed around pulleys, G and H, at either end of the dust spout, and is made to run up along over the partition, $d$, between the top portions of the sides of the spout, and down through the lower compartment ($c$) of the latter.

Adjustable belt stretching devices, I, may be used in connection with either or the one end pulley, to facilitate the tightening of the dust carrier from time to time and to adjust it in position relatively to the spout bottom. In this way, or by these means, the dust from the mill is automatically removed to a suitable elevation for after delivery or transfer, by the action of the dust carrier, F, in combination with the dust spout, E. But, this is not all. Such an arrangement of itself would speedily clog or foul with saw dust, were it not for a special provision which is made at the upper end of the spout, E; for, while it is almost impossible to prevent a certain amount of saw dust from getting under the top length of the carrier or between the carrier (F) and spout partition or botton (*d*), such lodgment, so far as ultimate delivery or removal from there is concerned, is of little or no consequence, as the working of the top length of the belt or carrier upward will gradually remove said dust or keep it from settling or running down to the bottom of the spout; but such lodgment proves an obstacle elsewhere, by the delivery of such dust, namely that which lies or is worked up under the top run of the belt, over the upper end of the spout and directly on to the lower length or run of the carrier belt F, which latter length would not only convey said escaping dust backward and downward, but also all saw dust that might be blown or drop over on to it from the sides of the upper length of the carrier at the delivery end of the spout, where more or less scattering necessarily takes place. Much dust would thus be carried down to and up around the lower end pulley G, thereby in time effectually choking said pulley or clogging the carrier and establishing an accumulation of dust where the same is to be avoided. To obviate this, I arrange a side branch conductor or conductors (K) at the top end of the main spout, E, and more or less transversely to it, the same being between the upper and lower lengths or runs of the dust carrier F, and so shaped and inclined as to catch and run off any dust that may be worked over the end of the partition, *d*, from underneath the upper run of the belt, as well as any that may be dropped or blown from off or over the sides of the top run of the belt as the latter emerges from the spout. Thus, the lower length of the carrier belt is kept clear and the easy and perfect working of the carrier preserved.

Where the removal of the saw-dust is to a greater distance than it is convenient or practicable to perform the work by one length of carrier, two or more carriers in succession may be used lying either at the same or different angles to each other, but the further delivery or use of the saw-dust, after it has been removed to a suitable elevation at a distance from the mill, forms no part of my present invention, which—

Having now described, I claim, as new and useful therein—

The arrangement for or in connection with the mill and its saw, of an upwardly inclining dust spout (E) and dust carrier or endless belt (F) operating to catch and convey the saw dust in the manner described; when the same is combined or the spout provided at its delivery end with a branch conductor or conductors (K) arranged between the upper and lower lengths of the carrier belt, essentially as and for the purpose or purposes herein set forth.

In testimony whereof, I have hereunto subscribed my name.

O. H. BURDETT.

Witnesses:
 JOHN MANSFIELD,
 WESLEY JOHNSON.